(12) United States Patent
Tarasinski et al.

(10) Patent No.: US 7,748,488 B2
(45) Date of Patent: Jul. 6, 2010

(54) STEERING SYSTEM FOR AN AGRICULTURAL OR INDUSTRIAL UTILITY VEHICLE AND METHOD FOR OPERATING A STEERING SYSTEM

(75) Inventors: Nicolai Tarasinski, Frankenthal (DE); Joachim Sobotzik, Lambsheim (DE); Marco Reinards, Bleialf (DE); Bernd Kneer, Viernheim (DE)

(73) Assignee: Deere & Company, Moline, IL (US)

( * ) Notice: Subject to any disclaimer, the term of this patent is extended or adjusted under 35 U.S.C. 154(b) by 278 days.

(21) Appl. No.: 10/572,650

(22) PCT Filed: Sep. 20, 2004

(86) PCT No.: PCT/EP2004/010542
§ 371 (c)(1),
(2), (4) Date: Dec. 27, 2006

(87) PCT Pub. No.: WO2005/030520
PCT Pub. Date: Apr. 7, 2005

(65) Prior Publication Data
US 2007/0144797 A1    Jun. 28, 2007

(30) Foreign Application Priority Data
Sep. 20, 2003    (DE) .................................. 103 43 640

(51) Int. Cl.
*B60K 28/16* (2006.01)
(52) U.S. Cl. .......................................... 180/242; 701/41
(58) Field of Classification Search ................ 180/65.1, 180/2.2, 242, 243, 65.21; 903/910, 905, 903/906; 701/83–84, 87–88, 110
See application file for complete search history.

(56) References Cited

U.S. PATENT DOCUMENTS 1,984,830 A * 12/1934 Higley .......................... 475/21

(Continued)

FOREIGN PATENT DOCUMENTS

DE    196 23 738    12/1997

(Continued)

*Primary Examiner*—Lesley Morris
*Assistant Examiner*—Levon Fiore

(57) ABSTRACT

The invention relates to a steering system for an agricultural or industrial utility vehicle, especially for a tractor. An electric drive (22, 24) is provided for each half of an axle, preferably a front axle (20), of the utility vehicle (10). Said electric drive can be driven by at least one wheel (26) associated with the each axle half. The electric drive (22, 24) can be controlled in such a manner that predetermined torque can be transmitted from the electric drive (22, 24) to the wheel (26) which is being driven. Preferably, the wheels (14) associated with a mechanical drive axle, particularly a rear axle (12) of the utility vehicle (10), can be driven by a mechanical drive (16, 18) of the utility vehicle (10). The invention also relates to a method for operating a steering system. The aim of the invention is to enable traction forces to be transmitted by wheels (26) driven by the electric drives (22, 24), even when the utility vehicle (10) negotiates bends, whereby particular braking torque should be prevented on said wheels (26) in specific steering angles. The torque which is to be transmitted to the wheel on the outside of the bend is greater that the torque which is to be transmitted to the wheel on the inside of the wheel in order to support or effect the steering of the utility vehicle.

22 Claims, 1 Drawing Sheet

U.S. PATENT DOCUMENTS

| | | | |
|---|---|---|---|
| 4,951,769 A * | 8/1990 | Kawamura | 180/65.4 |
| 5,301,769 A | 4/1994 | Weiss | |
| 5,388,658 A * | 2/1995 | Ando et al. | 180/197 |
| 5,465,806 A * | 11/1995 | Higasa et al. | 180/165 |
| 5,689,174 A * | 11/1997 | Pacheco, Sr. | 322/16 |
| 5,764,511 A * | 6/1998 | Henderson | 700/66 |
| 5,839,535 A * | 11/1998 | Arai | 180/197 |
| 5,850,616 A * | 12/1998 | Matsuno et al. | 701/82 |
| 5,947,855 A | 9/1999 | Weiss | |
| 6,386,305 B2 * | 5/2002 | Nakakita et al. | 180/65.8 |
| 6,422,333 B1 * | 7/2002 | Kjær et al. | 180/197 |

FOREIGN PATENT DOCUMENTS

| | | |
|---|---|---|
| EP | 0 553 670 | 1/1993 |

* cited by examiner

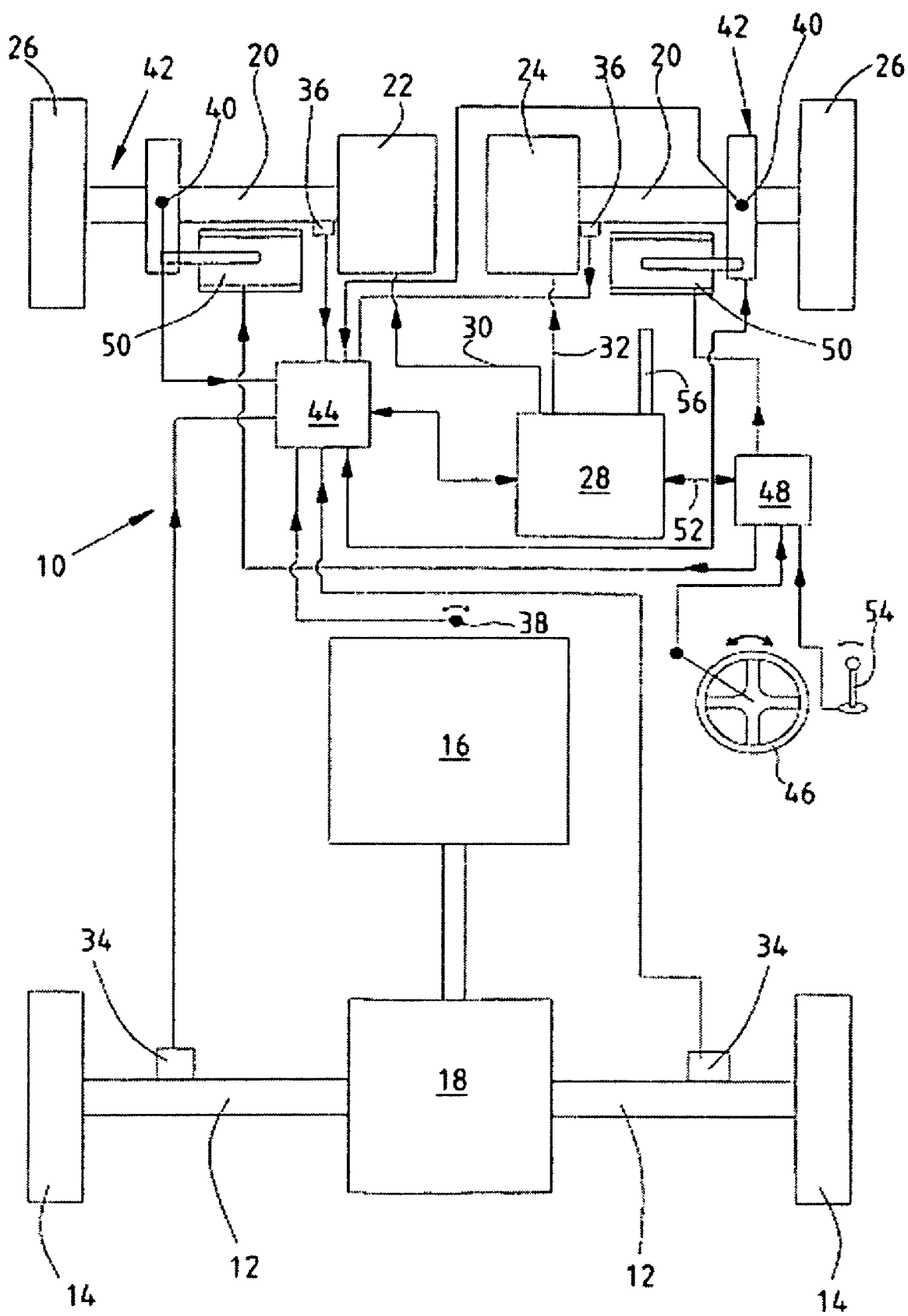

STEERING SYSTEM FOR AN AGRICULTURAL OR INDUSTRIAL UTILITY VEHICLE AND METHOD FOR OPERATING A STEERING SYSTEM

The invention relates to a steering system for an agricultural or industrial utility vehicle, especially for a tractor. An electric drive is provided for each half of an axle—preferably a front axle—of the utility vehicle, allowing at least one wheel associated with the respective half of the axle to be driven by means of said drive. The electric drive can be controlled such that predetermined torque can be transmitted by the electric drive to the wheel driven by it. Preferably the wheels associated with a mechanical drive axle—particularly a rear axle—of the utility vehicle can be driven by means of a mechanical drive of the utility vehicle. The present invention also relates to a method for operating a steering system.

Typically, a mechanical drive in a utility vehicle is provided by an internal combustion engine with a transmission. Particularly in the case of agricultural or industrial utility vehicles, the wheels associated with the rear axle of the utility vehicle are driven by the mechanical drive via a transmission and a differential gear arranged downstream from the transmission.

DE 196 23 738 A1 discloses a utility vehicle, which comprises a mechanical drive in the form of an internal combustion engine, by means of which the wheels of a drive axle can be driven. Each wheel of this drive axle is associated with a summing gear and is driven by the combination in the summing gear of the mechanical power from the drive shaft and the power from an electric motor. In one embodiment of the utility vehicle disclosed in DE 196 23 738 A1 a vehicle axle is provided, which merely comprises electric individual wheel drives. These electric individual wheel drives are powered by a generator, which is driven by the internal combustion engine. In another embodiment, an electronic controller processes signals from steering angle sensors for detecting the steering angle of the steered wheels as well as signals from wheel speed sensors. The controller then computes speed commands for each wheel from a predetermined desired speed and the sensed actual rotational speed and from the computed desired steering angle and the sensed actual steering angle, on the basis of which commands the electric motors can be controlled such that the speeds of the wheels driven by the electric motors are balanced when traveling in a curve. This way, equal forces are transmitted from the electric individual wheel drives via the wheels to the ground in accordance with the vehicle geometry and as a function of the steering angles of the two wheels. This type of control fulfills the Ackermann condition, which is disclosed for example in EP 0 533 670 B1.

In order to reach maximum tractive power, particularly for agricultural or industrial utility vehicles, it is in principle required that the front axle assumes its share of power transmitted by the utility vehicle to the ground in accordance with axle load distribution. However, since due to vehicle geometry and in particular due to mechanical steering the front wheels travel a larger curve radius during cornering than the rear wheels, the front wheels must have a greater peripheral speed because otherwise non-slip rolling motions of the corresponding wheels are not possible. In the present standard tractors—i.e. not the utility vehicle disclosed in DE 196 23 738 A1—the speed ratio of the wheels between the front and rear axles is fixed. Thus, a compromise between tight cornering and straight-ahead driving is required.

This is accomplished in that the front wheels have a lead of about 4% compared to the wheels of the rear axle, meaning that the wheels of the front axle rotate more quickly than those of the rear axle. When driving straight ahead, this results in strain and idle power between the drive axles, which is disadvantageous for chassis efficiency, places additional stress on the transmission, lead to increased tire wear and can damage the ground and/or the road, particularly when using a tractor in a field.

When traveling tight corners, however, particularly the lead of the wheel on the outside of the bend no longer suffices, and beyond certain steering angles braking torque even develops on the front wheels, which impacts the driving behavior of the tractor negatively. As a result, the front axle no longer transmits any traction force. This means that nearly ideal kinematic driving conditions exist only in a specific steering angle with a corresponding curve radius. Consequently, many tractor manufacturers disconnect the front axle drive above a specific steering angle. In this case, however, the front axle again does not transmit any traction force.

These problems were able to be resolved with a utility vehicle disclosed in DE 196 23 [7]38 A1, however the configuration of a hybrid drive axle is complex in its design and therefore expensive.

It is therefore the object of the invention to provide and further develop a steering system and a method for operating a steering system of the kind mentioned above, which overcome the afore-mentioned problems. In particular a steering system for an agricultural or industrial utility vehicle is supposed to be provided, which allows traction forces to be transmitted from the wheels driven by the electric drives even during cornering, wherein particularly braking torque on these wheels is supposed to be avoided in certain steering angles.

The object is achieved with the invention through the method of claim 1. Further advantageous embodiments and developments of the invention are disclosed in the dependent claims.

According to the invention, a steering system of the kind mentioned above is characterized in that the torque to be transmitted to a wheel on the outside of the bend is greater than the torque to be transmitted to a wheel on the inside of the bend in order to support or effect the steering of the utility vehicle.

According to the invention it has been discovered first that by providing an electric drive for each half of an axle of the utility vehicle, preferably of a front axle, the wheel associated with this half of the axle can be driven by the electric drive independently from the wheel of the other half of this axle. Thus it is not necessary to drive the wheels of this axle by means of a mechanical drive of the utility vehicle via a mechanical transmission. Such a solution would require a complicated and therefore expensive mechanical transmission to adjust varying rotational speeds on the wheels of the front axle. A significant component of the inventive steering system is also the torque control of the wheels, which are driven by an electric drive. In principle, a speed-regulated control is easy to implement. However, in this case it cannot be sufficiently guaranteed that the front axle will assume a defined tractive power of the utility vehicle under all steering conditions. A torque-regulated control of the wheels driven by the electric drives can therefore lead to improved handling of the utility vehicle when traveling in curves since the control can be such that during cornering also the front axle can transmit tractive forces. A torque-regulated control of the electric drives can also be implemented easily since the transmitted torque of an electric drive can be determined on the basis of the electrical power consumed by the electric drive as well as the rotational speed.

By controlling the wheel on the outside of the bend and the wheel on the inside of the bend with different torque, active steering of the utility vehicle is especially advantageously possible even when the steering angle of the wheels driven by the electric drives and the resulting geometry does not fulfill the Ackermann condition. At any rate, this control strategy allows optimal power transfer of the individual wheels to the ground, and hence optimal motion of the utility vehicle, adjusted to the respective steering situation.

In principle a controller is provided for controlling the electric drives, which controller could be configured for example as a single-board computer. In a preferred embodiment, the defined torque can be derived from the present operating state of the utility vehicle. A present operating state can be, for example, straight-ahead driving, cornering, or forward or backward driving of the utility vehicle. Additional parameters that characterize the present operating state of the utility vehicle include, for example, the rotational speed of the internal combustion engine, the present state of a gearbox or power-shift transmission, a potential towed load of the utility vehicle or a changing axle load distribution of the utility vehicle, as that which may occur during front-loading operations. Accordingly sensors are provided, which detect the present operating state of the utility vehicle and supply this information to the controller.

The defined torque could additionally or alternatively also be derived from operator input. Operator input could include, for example, the operation of a steering wheel of the utility vehicle by an operator. The defined torque that is to be transmitted is preferably derived from both the present operating state of the utility vehicle and from operator input, thus allowing an operator-regulated control of the wheels while taking the present operating state of the utility vehicle into consideration, which enables effectively intelligent cornering of the utility vehicle.

The present operating state of the utility vehicle relates particularly to a steering angle of a mechanical steering device of the utility vehicle. The mechanical steering device could comprise, for example, front axle steering. In this case the utility vehicle is steered by a combination of a torque-regulated drive of the wheels driven by the electric drives and a mechanical steering device, allowing advantageously the implementation of application-specific steering strategies. This includes, for example, turning the vehicle around with the smallest possible turning clearance circle at a low vehicle speed or traveling in a curve at average vehicle speed with a combination consisting of the utility vehicle and a trailer.

The mechanical steering device of the utility vehicle could be configured in the form of axle-pivot steering, a fifth wheel or articulated steering. The presently available mechanical steering angle can preferably be detected by means of a sensor. This way, the sensor can detect the present operating state of the utility vehicle, which can then be taken into consideration accordingly by the controller during steering.

A utility vehicle that is configured as a tractor and comprises a front leader may easily be subjected to critical driving situations, particularly in the loaded state of the front loader, due to a mechanical steering angle and simultaneous braking during a descent since in this case the steering may not respond or be oversteered under certain circumstances. One measure of the rotation of a vehicle about the vertical axis is the yaw rate. A preferred embodiment therefore comprises a yaw rate sensor, which allows the yaw rate of the utility vehicle to be detected, wherein the detected yaw rate can be included in the torque computation. With the help of the yaw rate sensor thus the rotation of the utility vehicle about the vertical axis can be detected so that advantageously critical driving situations can be avoided, wherein the corresponding control of additional assemblies of the utility vehicle may be required, such as that of a wheel brake.

Preferably an input device is provided, which can be operated by an operator of the utility vehicle and allows a change of the utility vehicle's direction to be defined or influenced. A change of direction should be interpreted particularly as a lateral deviation of the utility vehicle's driving motion, which is the result of steering input. The input device could comprise, for example, a steering wheel, a joystick, a pedal or at least one switch that is disposed on a steering wheel of the utility vehicle. If the input device comprises a steering wheel, on which a switch is provided, substantially conventional operation of the utility vehicle using the steering wheel would be possible, for example when the switch can only be actuated in extreme steering angles. This advantageously enables a brief learning phase for an untrained operator for operating a utility vehicle comprising an inventive steering system.

The utility vehicle could be provided with a system, which allows a desired driving direction to be defined. For example such a system could be an AMS—agriculture management solutions—system, which sends a desired driving direction command for optimal field cultivation to a utility vehicle, for example in the form of a tractor, particularly by means of radio signals. Such a system could comprise, for example, a GPS (global positioning system) satellite navigation system so that in the ideal case a utility vehicle can also be operated autonomously, i.e. without operator, since the utility vehicle will travel a specified path, controlled by the GPS and/or AMS. A system of this type typically comprises computer systems, including software, sensors and mobile controllers. In another particularly preferred embodiment the defined torque can be derived from a deviation of an actual driving direction from a desired driving direction of the utility vehicle, allowing the steering of the utility vehicle to be influenced accordingly.

The desired driving direction could be derived for example on the basis of a defined travel route. The defined travel route could be stored suitably in a memory unit associated with the utility vehicle and be entered and stored for example by means of one-time input by the operator. To determine the present position of the utility vehicle—for example when traveling the defined route—it could be provided that this position is derived based on signals received from a navigation system, which are transmitted remotely to the utility vehicle for example by at least one transmitter of the navigation system. To this end, the navigation system could comprise GPS, as is known per se already from the prior art.

For some applications it may prove advantageous to provide a remote control unit, which comprises at least one transmitter and a receiver, which is disposed on the utility vehicle. The remote control unit can be used to control the utility vehicle remotely, at least in part, and to allow an operator to input a desired change of the utility vehicle's direction. For example, a remote control unit could comprise similar controls as those that are used for controlling model cars or model airplanes.

An electric drive comprises at least one electric motor, which is preferably configured as an asynchronous motor. Asynchronous motors are inexpensive to produce, and a utility vehicle according to the invention can therefore be manufactured with relatively little additional expenses. Preferably at least one reducing gear is provided between the electric motor and the wheel associated therewith, which gear allows a high rotational speed of the electric motor to be reduced to a lower rotational speed, with which the wheel is driven in the end.

For the purpose of recording the present operating state of the utility vehicle a rotational speed sensor is provided for each wheel in a preferred embodiment, which sensor detects the present rotational speed of the respective wheel.

A rotational speed sensor for detecting the rotational speed of a wheel of the front axle could be provided directly or indirectly on an electric drive, thus allowing the rotational speed of the electric drive to be measured directly or indirectly, which can then be used to calculate the rotational speed of the respective wheel. This is insofar advantageous in that such a rotational speed sensor can be arranged more easily on the electric drive and be provided with connecting lines, since electric lines run to the electric drive anyhow.

It is particularly preferred if the defined torque is computed as a function of the detected rotational speeds of the individual wheels. In this respect a certain combination of rotational speed-regulated and torque-regulated steering of the utility vehicle exists, since in the case of a wheel turning too quickly on the inside of the bend during defined corning the electric drive driving this wheel transmits less torque to the wheel in response to the wheel's sensed rotational speed.

If the peripheral speed of the mechanically driven wheels associated with the rear axle is greater than that of the front wheels, the torque on the front wheels must be increased in order to adjust the peripheral speeds of all wheels to each other again and increase the tractive power portion of the front wheels and hence of the front axle. If the front wheels rotate at a greater peripheral speed than the rear wheels, the defined torque must be lowered on the front wheels. In principle it is attempted to achieve the least possible difference among the peripheral speeds of the wheels on the two drive axles.

During cornering, the wheel on the outside of the bend must have a higher peripheral speed than the wheel on the inside of the bend since—according to the Ackermann condition—it travels a larger curve radius.

In a particularly preferred embodiment it is therefore provided to take the difference between the mean value of the peripheral speeds of the wheels associated with the rear axle of the utility vehicle and the peripheral speed of the wheel driven by the electric drive into consideration in the computation of the torque that is to be transmitted by an electric drive of a wheel. This way, improved tractive force distribution of the individual drive axles of the utility vehicle can be achieved during cornering as a function of a respectively adjusted steering angle geometry and the respective peripheral speeds of the utility vehicle's wheels since in this case nearly ideal kinematic driving conditions exist and therefore no braking torque or slippage of one of the wheels occurs.

In this case the utility vehicle is advantageously supported during steering in that the torque on the wheel on the outside of the bend is raised and that on the wheel on the inside of the bend is lowered. This way the front axle transmits the corresponding tractive power even during cornering. The torque defined on the wheel on the outside of the bend can be increased disproportionately in the case of tight curve radii in order to achieve a further decrease in the turning clearance circle. The tractor is then pulled actively around the curve.

When computing the torque to be transmitted by an electric drive of a wheel, this could be taken into consideration concretely with the help of one or more lookup tables. Particularly several tables could be provided, especially one for each operating mode, for example depending on whether the electric drive performs forward or reverse travel. In this table then data of the torque to be transmitted could be stored as a function of the steering angle of the respective wheel of the front axle. The difference between the mean value of the peripheral speeds of the wheels associated with the rear axle of the utility vehicle and the peripheral speed of the corresponding wheel could be stored there as well.

In another embodiment it is provided that a limit of the torque to be transmitted to a wheel is established when this wheel driven by an electric drive exceeds a defined rotational speed threshold. This prevents above all that an electric drive will attempt to transmit a defined torque to the wheel it drives although this wheel, for whatever reason, has no contact with or no traction in relation to the ground and would therefore just be accelerated further.

The wheels driven by the electric drives could be controlled such that varying torque values are only defined for the wheels driven by the electric drives after a defined value of a present operating state of the utility vehicle has been exceeded and/or following operator input. This type of control in some respects represents a threshold control.

Using the inventive steering system, the electric drives can be controlled in a non-linear fashion such that optimized tire wear is achieved in the case of large curve radii and/or that a minimal turning clearance circle diameter is achieved in the case of small curve radii.

Additionally, a differential lock could be activated, which would allow equal peripheral speeds of the wheels driven by the electric drives to be generated. This particularly useful when driving straight ahead.

If a slight change of direction of the utility vehicle should be desired, this could be achieved merely by means of a defined difference in transmitted torque of the electric drives. In this case, a steering angle of a possibly provided mechanical steering device of the utility vehicle could be foregone.

There are driving situations in which counter-steering by the utility vehicle in response to influences, such as a substantially constant extraneous cause that is applied on the utility vehicle, is required. One example of such an extraneous cause occurs when the utility vehicle travels parallel to a slope. In such a case it is advantageously provided that counter-steering by the utility vehicle can be achieved merely by activating the electric drives.

Additionally the inventive steering system allows activation of the electric drives such that a stabilization of the utility vehicle—which is known per se from the prior art—can be achieved. This way the safety properties of the utility vehicle can be improved particularly advantageously.

Various possibilities are available for advantageously configuring and further developing the method of the present invention. In this respect, reference is made on one hand to the patent claims referring back to claim 1 and on the other hand to the preferred embodiment of the invention, which will be explained in more detail hereinafter with reference to the drawing. Generally preferred embodiments and further developments of the method are also explained in conjunction with the explanation of the preferred embodiment of the invention with reference to the drawing.

The only FIGURE shows a schematic illustration of the individual assemblies of an agricultural utility vehicle 10.

The agricultural utility vehicle 10 is configured as a tractor and comprises a rear axle 12, which is associated with the wheels 14. The rear axle 12 of the utility vehicle is driven by a mechanical drive 16 configured as an internal combustion engine via a transmission and a differential. The transmission and the differential are illustrated as one unit 18 for simplicity reasons.

The agricultural utility vehicle 10 comprises a front axle 20, wherein an electric drive 22, 24 is provided for each half of the front axle 20 of the utility vehicle 10. The electric drive 22 is provided for the left half of the axle, the electric drive 24 for the right half of the front axle 20. The electric drives 22, 24 are used to drive a wheel 26 of the front axle 20, respectively.

The agricultural utility vehicle 10 comprises a steering system according to the invention, which allows the steering of the utility vehicle to be supported or effected, specifically in that the torque to be transmitted to a wheel on the outside of a bend is greater than the torque to be transmitted to a wheel on the inside of a bend. For this purpose a controller 28 is provided, which allows the electric drives 22, 24 to be controlled by means of the control lines 30, 32.

The defined torque that can be transmitted from an electric drive 22 or 24 to the respectively driven wheel 26 can be derived from the present operating state of the utility vehicle. For the detection of the present operating state of the utility vehicle several sensors are provided. This includes particularly two sensors 34, which detect the rotational speed of the wheels 14 associated with the rear axle 12. Additionally, rotational speed sensors 36 are provided, which are disposed on the electric drives 22, 24 and which allow the rotational speeds of the wheels 26 associated with the front axle 20 to be detected indirectly. Furthermore a yaw rate sensor 38 is provided, which detects the yaw rate of the utility vehicle 10, with the yaw rate being indicated by the double arrow on the yaw rate sensor 38. The steering angle sensors 40 detect the respective steering angle of the mechanical steering device 42, which is configured as an axle-pivot steering. The signals detected by the sensors 34, 36, 38 and 40 are conducted via corresponding lines to an electrical unit 44, which is in turn connected to the controller 28 via a connecting line. The electrical unit 44 could also be incorporated in the controller 28.

On the other hand, it is also possible to provide operator input with the schematically illustrated steering wheel 46. The movements of the steering wheel 46 are forwarded to the steering device 48, thus controlling the cylinders 50 of the mechanical axle-pivot steering 42. The steering device 48 is connected to the controller 28 of the inventive steering system via the connecting line 52. In the direct vicinity of the steering wheel 46 a switch 54 is disposed, which is only illustrated schematically and which allows the operator of the utility vehicle 10 to control the inventive steering system directly. This way the signals generated by the switch 54 are transmitted via the steering device 48 to the controller 28 and thus to the electric drives 22, 24.

A receiving antenna 56 is shown on the controller 28, which antenna can receive signals from a navigation system, which is not shown in the only FIGURE, or from a remote control device.

The two electric drives 22, 24 are configured as asynchronous motors. In the only illustrated operating state of the utility vehicle 10, the mechanical steering device 42 has a straight ahead or zero steering angle. Without the inventive steering system the utility vehicle would only drive straight ahead. By integrating the inventive steering system in the process, however, slight directional changes can be performed by the utility vehicle 10 even with no steering angle of the mechanical steering device 42 so that for example active counter-steering of the utility vehicle in response to a substantially constant extraneous cause that is applied on the utility vehicle is not required by the operator.

In closing it should be pointed out in particular that the above-explained examples of the embodiment only serve the description of the claimed method, but do not limit it to the examples.

The invention claimed is:

1. A steering system for a utility vehicle, the vehicle having a front axle, a rear axle, a pair of front wheels, a pair of rear wheels, an internal combustion engine driving a mechanical drive for driving the rear wheels on the rear axle, so that the internal combustion engine is drivingly connected to the rear wheels through only purely mechanical components, and so that all the drive components between the internal combustion engine and the rear wheels are purely mechanical, and a pair of electric drives, each for driving one of the front wheels, and a controller for controlling the electric drives and causing each electric drive to transmit a defined torque to a corresponding one of the front wheels, wherein:

when the vehicle is turning, the vehicle having a radial outer front wheel and a radially inner front wheel, the electric drive supplying a greater torque to the outer front wheel and supplying a lesser torque to the inner front wheel, wherein: torque transmitted by the electric drive is computed as a function of a difference between a mean value of peripheral speeds of the rear wheels and the peripheral speed of the driven front wheel.

2. The steering system of claim 1, wherein:
the defined torque is derived from an operating state of the vehicle and from an operator input.

3. The steering system of claim 2, wherein:
the vehicle includes a front axle mechanical steering device, and the operating state comprises a steering angle of the front axle mechanical steering device.

4. The steering system of claim 3, wherein:
the steering angle is detected by a sensor.

5. The steering system of claim 1, further comprising:
a yaw rate sensor which senses a yaw rate of the vehicle, and the defined torque is derived from the sensed yaw rate.

6. The steering system of claim 2, wherein:
the vehicle includes an input device which can be used by an operator to change a direction of the vehicle.

7. The steering system of claim 6, wherein:
the input device comprises a steering wheel, a joystick, a pedal or a switch on a steering wheel of the vehicle.

8. The steering system of claim 1, wherein:
the defined torque is derived from a difference between an actual driving direction and a desired driving direction of the vehicle.

9. The steering system of claim 8, wherein:
the desired driving direction of the vehicle is derived from a defined travel route stored in a memory unit.

10. The steering system of claim 8, wherein:
a navigation system includes a remote transmitter which transmits navigation signals, and the desired driving direction is derived from the navigation signals.

11. The steering system of claim 1, further comprising:
a remote control system which includes a transmitter and a receiver on the vehicle, the remote control system allowing the vehicle to be controlled remotely.

12. The steering system of claim 1, wherein:
the electric drive comprises an asynchronous electric motor.

13. The steering system of claim 1, wherein:
a rotational speed sensor is coupled to each wheel.

14. The steering system of claim 13, wherein:
a rotational speed sensor is coupled to the electric drive.

15. The steering system of claim 13, wherein:
the defined torque is computed as a function of the rotational speeds of the wheels.

16. The steering system of claim 1, wherein:
the torque transmitted to the wheel driven by an electric drive is limited when a threshold rotational speed of the wheel driven by the electric drive has been exceeded.

17. The steering system of claim 1, wherein:
the steering system prevents varying the defined torque until a defined value of a vehicle operating state has been exceeded.

18. The steering system of claim 1, wherein:
the electric drives are controlled in a non-linear fashion to optimize tire wear during large radius turns and to minimize turning radius during small radius turns.

19. The steering system of claim 1, further comprising:
a differential lock which allows the front wheels to be driven at equal peripheral speeds.

20. The steering system of claim 1, wherein:
the vehicle can be steered by causing the electric drives to transmit differing torques to each of the front wheels.

21. The steering system of claim 1, wherein:
the electric drives are controlled to counter-steer the vehicle when moving across a slope.

22. The steering system of claim 1, wherein:
the electric drives are controlled to stabilize the vehicle.

* * * * *